United States Patent
Großkinsky et al.

(10) Patent No.: US 9,803,086 B2
(45) Date of Patent: Oct. 31, 2017

(54) REINFORCEMENT FOR A MATERIAL MADE FROM A MOLDABLE COMPOSITION

(71) Applicant: Fraunhofer-Gesellschaft zur Förderung der angewandten Forschung e.V., Munich (DE)

(72) Inventors: Theo Großkinsky, Holzkirchen (DE); Martin Krus, Feldkirchen Westerham (DE); Werner Theuerkorn, Postmünster (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 388 days.

(21) Appl. No.: 14/391,669

(22) PCT Filed: Apr. 25, 2013

(86) PCT No.: PCT/EP2013/058606
§ 371 (c)(1),
(2) Date: Oct. 9, 2014

(87) PCT Pub. No.: WO2013/160394
PCT Pub. Date: Oct. 31, 2013

(65) Prior Publication Data
US 2015/0059618 A1    Mar. 5, 2015

(30) Foreign Application Priority Data
Apr. 26, 2012   (DE) ........................ 10 2012 206 954

(51) Int. Cl.
*C08L 97/02* (2006.01)
*C04B 26/02* (2006.01)
*C04B 28/00* (2006.01)
*C04B 28/02* (2006.01)
*C04B 40/00* (2006.01)

(52) U.S. Cl.
CPC .............. *C08L 97/02* (2013.01); *C04B 26/02* (2013.01); *C04B 28/001* (2013.01); *C04B 28/02* (2013.01); *C04B 40/0039* (2013.01); *Y02W 30/97* (2015.05); *Y10T 428/249921* (2015.04)

(58) Field of Classification Search
CPC ... C04B 28/001; C04B 40/0039; C04B 18/24; C04B 28/00; C04B 40/00; C08L 97/02; Y02W 30/97
USPC ..................................... 106/164.01
See application file for complete search history.

(56) References Cited

FOREIGN PATENT DOCUMENTS

| DE | 40 00162 C2 | 9/1993 |
|---|---|---|
| EP | 0 436 220 A1 | 7/1991 |

*Primary Examiner* — Camie Thompson
(74) *Attorney, Agent, or Firm* — Brinks Gilson & Lione

(57) ABSTRACT

Reinforcement for a material may be provided that includes a moldable composition, particularly for a building material, in which barley awns and seed parachutes, such as from bulrush seeds, are present as components in the reinforcement. The seed parachutes may comprise stem fibers and lateral fibers branching off therefrom, where the lateral fibers of the seed parachutes are connected to one another by the barley awns. The barley awns may have a weight proportion of approximately 0.1 to approximately 2 times, such as approximately 0.5 to approximately 1 time, higher than the weight proportion of the seed parachutes. A building material may be provided that includes the described reinforcement. A method for producing the building material may also be provided.

18 Claims, 2 Drawing Sheets

REINFORCEMENT FOR A MATERIAL MADE FROM A MOLDABLE COMPOSITION

This application is a national stage entry of International Patent Application PCT/EP2013/058606, filed Apr. 25, 2013, entitled "REINFORCEMENT FOR A MATERIAL CONSISTING OF A MOULDABLE COMPOUND," the entire contents of which are incorporated by reference, which in turn claims priority to German patent application 10 2012 206 954.2, filed Apr. 26, 2012, entitled "VERSTÄRKUNG FÜR EINEN WERKSTOFF AUS EINER FORMBAREN MASSE", the entire contents of which are incorporated by reference.

BACKGROUND

The application relates to a reinforcement for a material made from a moldable composition. Reinforcements for materials made from moldable compositions can also be provided from renewable materials. For example, it is known from DE 40 00 162 C2 that parachutes from cattail seeds can be used for reinforcing a ceramic composition. It is also known from DE 40 00 162 C2 that various renewable raw materials can be used in a mixture. However, the materials here do not always attain the required strength. It is therefore an object of the present invention to provide a reinforcement by means of which the materials acquire the required strength. A further object of the invention is to provide a building material having such reinforcement and indicate a production process for the building material.

BRIEF DESCRIPTION OF THE DRAWINGS

Further details of the invention will be detailed with the aid of the following figures. In the figures, FIG. 1 schematically shows three parachutes whose lateral fibers adjoin to fragments of barley awns.

DETAILED DESCRIPTION

Figure 1:
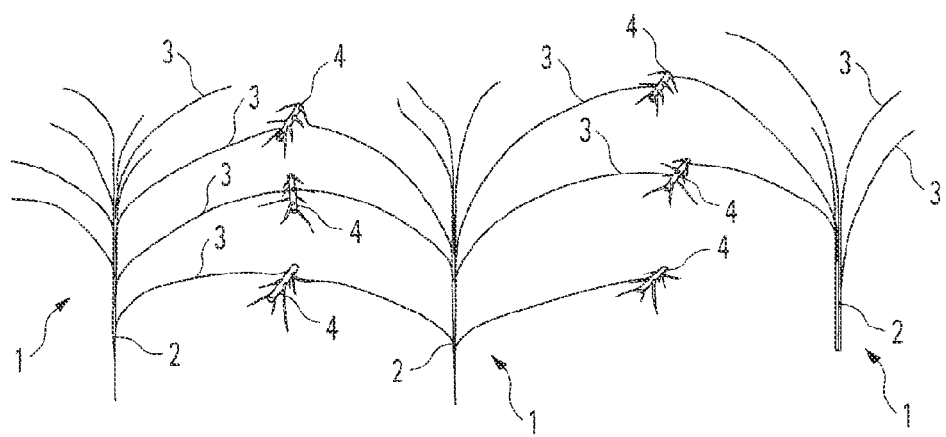

According to the invention, a reinforcement for a material made from a moldable composition is provided. The moldable composition can be, in particular, a building material. Barley awns and parachutes of seeds, in particular cattail seeds, are present as components in the reinforcement. Cattails are also frequently referred to by the scientific name *Typha*. A number of types of these are known. The types "narrowleaf cattail" having the scientific name "*Typha angustifolia*" and "broadleaf cattail" having the scientific name "*Typha latifolia*" are important in the present case. The parachutes here have stem fibers and lateral fibers branching off from the stem fibers. The lateral fibers are frequently also referred to as side arms. The lateral fibers of the parachutes are joined to one another by the barley awns. It is important that the proportion by weight of the barley awns and the parachutes are suitably matched to one another.

Empirical studies have found that the proportion by weight of the barley awns should be from about 0.1 time to about twice the proportion by weight of the parachutes. Particularly favorable conditions are obtained when the proportion by weight is from about 0.5 time to about one time that of the parachutes.

The mechanism of action of this reinforcement is worthy of further explanation here. The barley awns by nature have barbs into which the lateral fibers of the parachutes can be jammed. This results in joining of the lateral fibers to one another. A joining of lateral fibers of an individual parachute can occur here. However, in particular, joining of lateral fibers of different parachutes also occurs. This gives relatively large and joined-up structures which form a stable three-dimensional network. The material made from a moldable composition can be reinforced well in this way. However, not too many barley awns should be present since the stiffness of the barley awns would break up the structure of the compositions. If too many barley awns were to be present, the pieces of barley awns would project undesirably from the molding composition. It was necessary to understand these relationships and empirically determine a favorable proportion by weight of barley awns and parachutes.

In DE 4000162 C2, there column 8, example 6, an example in which both parachutes and barley awns are provided as reinforcement for a moldable composition, there a loam render composition, is given. However, 6.5 parts by weight of barley awns to 1.5 parts by weight of parachutes of cattail seeds are proposed. At such a high proportion of barley awns, the abovementioned problems occur, so that no optimal reinforcement is achieved. This is achieved only by means of the weight proportion range according to the invention.

It is not useful to indicate a precise optimal proportion by weight. The materials in question here are natural products which are always subject to certain fluctuations. For this reason, it is possible to indicate only ranges for optimal proportions by weight. In addition, it is also inconsequential whether the proportions by weight are adhered to exactly. Large deviations, for instance the value given in DE 4000162 C2, there column 8, example 6, are obviously to be avoided.

In an embodiment of the invention, the barley awns are present as fragments having a length of from about 2 mm to about 4 cm. It has been found to be particularly advantageous for the barley awns to be present as fragments having a length of about 4-8 mm. In the case of these relatively small fragments of the barley awns, the resulting network structure of barley awns and parachutes becomes three-dimensionally more effective. In addition, this fragmentation of the barley awns also makes mechanical handling of compositions reinforced in this way easier since the customary screw transport would fragment longer particles in an unacceptable way as a result of torsion.

In an embodiment, the stem fibers have a length of about 3 mm and/or the lateral fibers have a length of about 10 mm. It goes without saying that length fluctuations of about 50% from the indicated values are conceivable. In the case of the length of the stem fibers, it has to be taken into account that the length of the seed is added thereto.

In the case of the particularly suitable parachutes of cattail seeds of the species *Typha latifolia*, the stem fiber length is made up of a seed having a length of about 2 mm and the attached bundle of fibers having a length of 2.5 mm. Lateral fibers having a length of about 8.5 mm branch off therefrom. Good results have been achieved using these parachutes.

The invention provides a building material, for example a render mixture, having a reinforcement as described above. The requirement of building sustainably increases the demand for building materials having a high proportion of renewable raw materials. For this reason, there is also a demand for building materials, especially render mixtures, having reinforcement composed of biologically renewable raw materials, as presented above. In the case of render mixtures in particular, it has been found that reinforcement is of great importance. Render mixtures without reinforcements or with insufficient reinforcement have the problem that cracks can be formed in the render during drying of the render mixture after application of the moist render mixture. These cracks are visually undesirable and sometimes impair the protective function of the render. The usability and acceptability of a render mixture therefore depends critically on no crack formation occurring during drying. In order to avoid cracks, it is often proposed in the prior art that the render be applied in a plurality of layers and/or a woven mesh be introduced into the render. This makes a plurality of operations necessary, so that it is very advantageous to introduce a reinforcement into the render mixture in order to avoid crack formation. A particular aspect relates to buildings which are on the National Register of Historic Places, since sometimes only one layer of render is allowed to be applied here, so that the alternative of applying a plurality of render mixtures is ruled out.

In an embodiment of the invention, the building material is a render mixture containing clay. It can be, for example, a loam render. Loam is, as is known, a mixture of sand, silt and clay. However, there are also renders having a very high proportion of clay, so that it is normally no longer possible to speak of a loam render. Such render mixtures can also be reinforced well using the reinforcement described here.

In an embodiment of the invention, the building material is a mineral render and/or a synthetic resin render. Such renders are very widespread on the market and have positive properties in respect of long-term stability, thermal insulation and visual appearance.

In an embodiment of the invention, the building material contains leaf particles of cattail leaves. Predominant here are the leaves of *Typha angustifolia*. The addition of these leaves enables thermal insulation to be improved. In contrast to many other renewable raw materials, these leaves do not contain any silicon dioxide. This allows the leaves to be cut using sharp knives, so that clearly outlined particles having a small surface area can be provided. This leads to a reduced need for adhesives and thus to a reduced decrease in the strength. The building material of the invention which contains the reinforcement enables problems in respect of the strength to be reduced further. When parachutes of cattail seeds are used in the reinforcement, there are also no problems in respect of biological compatibility to be expected, even when the parachutes used are from *Typha latifolia* while the leaves are normally obtained from *Typha angustifolia*.

To produce a building material as indicated above, the following process is suitable. A building material firstly has to be selected. Barley awns then have to be provided. The barley awns are then mixed with parachutes of seeds, in particular cattail seeds. Here, as indicated above, the proportion by weight of the barley awns is from about 0.1 time to about twice the proportion by weight of the parachutes. Mixing with the selected building material is then carried out. In general, mixing with a dry mixture of the building material is carried out. It might normally be more advantageous firstly to mix the individual components on an effectively industrial scale using specifically designed mixing apparatuses and carry out mixing with water only on the building site. This leads to improved mixing results, reduced transport costs since the water does not also have to be transported and better durability since dry mixtures keep better. However, it should be emphasized that the order of the steps is not absolutely necessary. It would also be conceivable, for example, to add the parachutes to the dry mixture of the building material, mix this with water and then subsequently add barley awns.

In the harvesting of barley, the crop being harvested frequently goes directly into a combine harvester in the field. In many cases, fragments of barley awns are used instead of entire barley awns. Awn breakers are usually present in the combine harvesters. In these, the harvested barley awns are broken so that fragments of barley awns are obtained. In the above-described process, fragments of barley awns are then used instead of the entire barley awns. An advantage of fragments instead of entire barley awns is obtained, for example, in the case of render mixtures which have to be applied thinly. Here, entire barley awns would project in a visually undesirable manner.

In an embodiment of the production process, the proportion of fragments having the desired length is increased by sieving. Fragments of barley awns of differing lengths are formed, for example, in the abovementioned breaking up in awn breakers of combine harvesters. Appropriate sieving makes it possible to sort out those barley awns which do not have the desired length, so that the desired lengths remain.

In a further embodiment of the process, the parachutes are made unable to germinate. This can be effected by heating and/or irradiation of the parachutes, more precisely the seeds which are located on the parachute. A further possibility is to remove the seeds from the parachutes, for instance by means of a water jet or an air jet. It is advisable to make the parachutes unable to germinate. This ensures that no undesirable plant growth occurs in the moldable composition, i.e. usually in the building material.

FIG. 1 shows three parachutes 1 of cattail seeds. These each have a stem fiber bundle 2. A plurality of lateral fibers 3 branch off from each stem fiber bundle 2. It should be noted that FIG. 1 is very schematic and, for example, does not show that the lateral fibers 3 also point downward, i.e. in the direction of seeds 5, as is clear from FIG. 2. These lateral fibers 3, also known as side arms, engage with the barbs of the fragments 4 of the barley awns. This effects joining of the various lateral fibers 3. A stable three-dimensional network of different parachutes 1 is formed. This network is then able to strengthen lean mineral compositions to such an extent that they remain malleable and in the cured state withstand many stresses.

Figure 2:
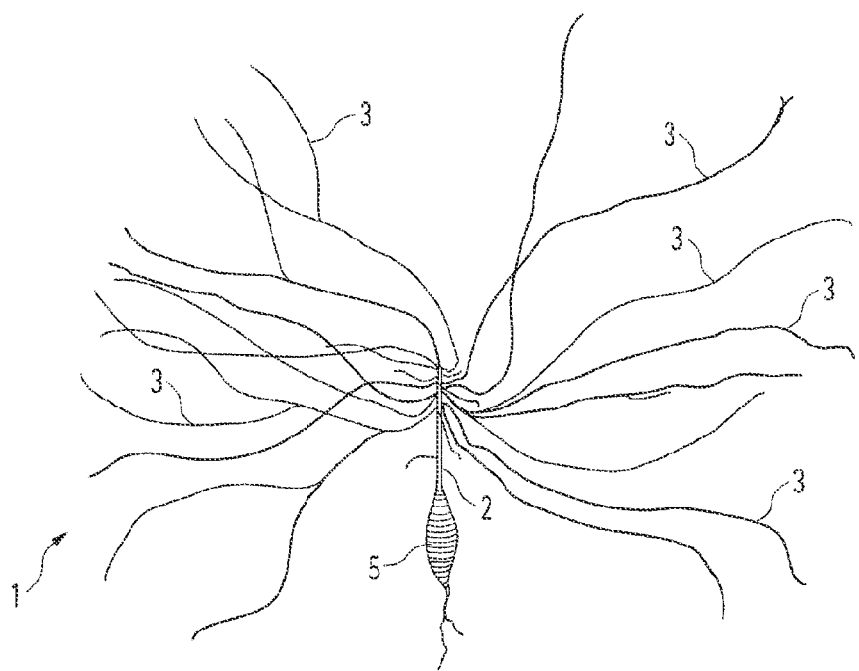
FIG. 2 shows a parachute in more detail.

FIG. 2 shows a single parachute of a cattail seed in more detail. The seed 5 can be seen. This is adjoined by the stem fiber bundle 2. Here, the seed 5 has a length of about 2 mm and the stem fiber bundle 2 itself has a length of about 2.5 mm. The individual lateral fibers 3 branch off therefrom. A typical length of the lateral fibers 3 is 8.5 mm.

Figure 3:
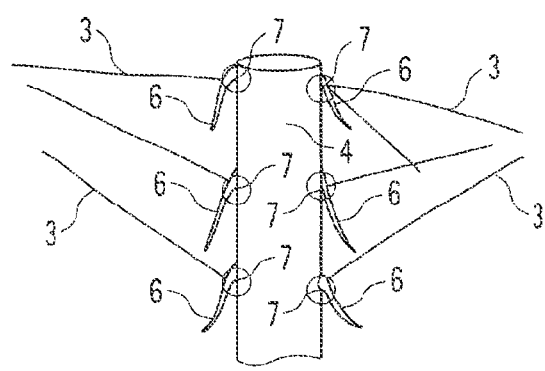
FIG. 3 shows a barley awn in more detail.

FIG. 3 shows an individual fragment 4 of a barley awn. The fragments 4 of the barley awns are so suitable for joining of the lateral fibers 3 because their barbs have a shape on which the lateral fibers of the cattail seeds easily jam. At the jamming points 7, the lateral fibers 3 are joined by jamming at the barbs 6.

LIST OF REFERENCE NUMERALS

1 Parachutes of cattail seeds
2 Stem fiber bundle
3 Lateral fibers
4 Fragments of barley awns
5 Seeds of the seed parachutes
6 Barbs
7 Jamming points

The invention claimed is:

1. A reinforcement for a material made from a moldable composition, the reinforcement comprising barley awns and parachutes of seeds, the parachutes including stem fibers and lateral fibers branching off therefrom, the lateral fibers of the parachutes joined to one another by the barley awns, and the proportion, by weight, of the barley awns to the parachutes is in a range from about 0.1 to about 2.

2. The reinforcement of claim 1, wherein the barley awns are fragments having lengths that are within a range from about 2 mm to about 4 cm.

3. The reinforcement of claim 1, wherein the stem fibers have a length of about 3 mm.

4. The reinforcement of claim 1, wherein the reinforcement is included in a building material.

5. The reinforcement of claim 4, wherein the building material is a render mixture which includes clay.

6. The reinforcement of claim 4, wherein the building material is a mineral render and/or a synthetic resin render.

7. The reinforcement of claim 4, wherein the building material further comprises leaf particles of cattail leaves.

8. The reinforcement of claim 4, wherein the building material comprises a render mixture.

9. A method for producing the building material as claimed in claim 4, the method comprising:
selecting the building material;
mixing the barley awns with the parachutes of seeds to form a mixture of the barley awns with the parachutes of seeds, wherein the proportion, by weight, of the barley awns to the parachutes in the mixture is in the range from about 0.1 to about 2; and
mixing the mixture of the barley awns and parachutes of seeds with the selected building material.

10. The method of claim 9 further comprising making the parachutes unable to germinate.

11. The method of claim 9 further comprising breaking up the barley awns before mixing with the parachutes so that the barley awns are present as fragments.

12. The method of claim 11 further comprising increasing a proportion of fragments in the mixture having a predetermined length by sieving.

13. The reinforcement of claim 1, wherein the parachutes of seeds are parachutes of cattail seeds.

14. The reinforcement of claim 1, wherein the proportion, by weight, of the barley awns to the parachutes is in a range from about 0.5 to about 1.

15. The reinforcement of claim 1, wherein the lateral fibers of the parachutes have a length of about 10 mm.

16. The reinforcement of claim 1, wherein the barley awns have lengths that are within a range from about 4 mm to about 8 mm.

17. A building material comprising a render mixture, barley awns, and parachutes of seeds, the parachutes including stem fibers and lateral fibers branching off therefrom, the lateral fibers of the parachutes joined to one another by the barley awns, and the proportion, by weight, of the barley awns to the parachutes is in a range from 0.5 to 1.

18. The building material of claim 17, wherein the barley awns have lengths that are within a range from 4 mm to 8 mm.

* * * * *